United States Patent
Luo et al.

(10) Patent No.: US 12,331,507 B2
(45) Date of Patent: Jun. 17, 2025

(54) METHOD FOR MANUFACTURING NON-MAGNETIC SPATIAL LATTICED SHELL STRUCTURE COMPOSED OF CARBON FIBER PLATE MEMBERS

(71) Applicants: INNOVATION CENTER OF YANGTZE RIVER DELTA, ZHEJIANG UNIVERSITY, Zhejiang (CN); ZHEJIANG UNIVERSITY, Zhejiang (CN)

(72) Inventors: Yaozhi Luo, Hangzhou (CN); Huibin Ge, Hangzhou (CN); Yuan Cheng, Hangzhou (CN); Chao Yang, Hangzhou (CN)

(73) Assignees: INNOVATION CENTER OF YANGTZE RIVER DELTA, ZHEJIANG UNIVERSITY, Jiaxing (CN); ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/035,773

(22) Filed: Jan. 23, 2025

(65) Prior Publication Data
US 2025/0163694 A1    May 22, 2025

Related U.S. Application Data

(63) Continuation of application No. PCT/CN2024/094825, filed on May 23, 2024.

(30) Foreign Application Priority Data

Jun. 7, 2023    (CN) .......................... 202310672029.3

(51) Int. Cl.
E04B 1/32    (2006.01)

(52) U.S. Cl.
CPC ..... *E04B 1/3211* (2013.01); *E04B 2001/3241* (2013.01); *E04B 2001/3252* (2013.01)

(58) Field of Classification Search
CPC .......... E04B 2001/3241; E04B 1/3211; E04B 1/3252
See application file for complete search history.

(56) References Cited

U.S. PATENT DOCUMENTS

| | | | |
|---|---|---|---|
| 2009/0071322 A1 | 3/2009 | Oxford et al. | |
| 2010/0301864 A1 | 12/2010 | Yamazaki et al. | |

FOREIGN PATENT DOCUMENTS

| | | |
|---|---|---|
| CN | 215168458 U | 12/2021 |
| CN | 116556689 A | 8/2023 |

(Continued)

OTHER PUBLICATIONS

JP 2006261618 A (Year: 2006).*
International Search Report (PCT/CN2024/094825); Date of Mailing: Sep. 5, 2024(7 pages).

*Primary Examiner* — Jason L Vaughan
*Assistant Examiner* — Amanda Kreiling
(74) *Attorney, Agent, or Firm* — Wiersch Law Group

(57) ABSTRACT

A method for manufacturing a non-magnetic spatial latticed shell structure composed of carbon fiber plate members. The load-bearing member of the latticed shell structure is made of non-magnetic carbon fiber plate, and joints are made of non-magnetic titanium alloy material. The magnetic shielding layer is provided on the roofing system above the structural layer, and a non-magnetic space with a magnetic field strength lower than 1 nT is formed inside the structure. The load-bearing members are fixed by two carbon fiber limb plates in the form of inter-limb connection and forms an hollow rectangular built-up section; and the joint comprises a titanium alloy gusset plate, a titanium alloy bolt group, and a carbon fiber limb plate; the magnetic shielding (Continued)

layer of the roofing system comprises a shielding layer pad, a shielding layer, a shielding laminate, a buffer layer, a permalloy plate, and a batten.

6 Claims, 3 Drawing Sheets

(56) References Cited

FOREIGN PATENT DOCUMENTS

| JP | H08226190 A | 9/1996 |
| JP | 2002172101 A | 6/2002 |
| JP | 2006261618 A | 9/2006 |
| JP | 2011061100 A | 3/2011 |

\* cited by examiner

METHOD FOR MANUFACTURING NON-MAGNETIC SPATIAL LATTICED SHELL STRUCTURE COMPOSED OF CARBON FIBER PLATE MEMBERS

CROSS-REFERENCE TO RELATED APPLICATIONS

The present application is a continuation of International Application No. PCT/CN2024/094825, filed on May 23, 2024, which claims priority to Chinese Application No. 202310672029.3, filed on Jun. 7, 2023, the contents of both of which are incorporated herein by reference in their entireties.

TECHNICAL FIELD

The present disclosure relates to the field of space structures, and in particular, to a method for manufacturing a non-magnetic spatial latticed shell structure composed of carbon fiber plate members.

BACKGROUND

In a kind of special-purpose building structure, such as an experimental center that needs to create a non-magnetic environment, it not only needs a large internal space, but also ensures that the magnetic field strength in the space is almost zero. The existence of geomagnetic field leads to the presence of a certain intensity of magnetic field in most natural or artificial places on the earth, which cannot guarantee the smooth progress of non-magnetic experiments. Covering the building skin with magnetic shielding materials can weaken the magnetic field strength of the internal space to a certain extent, but the common used materials (such as steel and reinforced concrete) in traditional structural systems have certain magnetism themselves. Therefore, they are not suitable for being used as the main structural materials in a non-magnetic environment. Although bamboo and wood are non-magnetic materials, they are not widely used in building structures with high importance because of their poor fire and corrosion resistance.

Carbon fiber material has the characteristics of lightweight, high strength, corrosion resistance, and non-magnetism, which is especially suitable for the functional requirements of the above-mentioned building structures. Traditional latticed shell structures generally adopt sectional steel members with circular, square, or I-shaped sections, but the manufacturing and processing technology of carbon fiber plates makes it difficult to be processed into sectional members with the above sections, and more carbon fiber plates are used. At present, steel plate members have been used as in the primary structure of free-form surface latticed shell structure. The advantages include that: 1) the plate members can be fabricated into any curved profile by laser cutting technology, with high efficiency and precision; 2) plate members can be stacked efficiently, saving a lot of space during storage and transportation; and 3) the section of the plate member is a regular rectangle and the joint is simple, which is suitable for the assembled structure. Therefore, using carbon fiber plate members in the primary structure also has a certain application prospect. A latticed shell structure composed of carbon fiber plate members with a span of more than 30 m can be built on the premise of reasonable economic cost.

The present disclosure provides a method for manufacturing a non-magnetic spatial latticed shell structure composed of carbon fiber plate members, based on the excellent performance (lightweight, high strength, and non-magnetic) of carbon fiber material and plate members. This disclosure can help effectively solve the building problem of how to create a non-magnetic environment with a new space structure form.

SUMMARY

In view of the shortcomings in the prior art, the present disclosure provides a method for manufacturing a non-magnetic spatial latticed shell structure composed of carbon fiber plate members.

The object of the present disclosure is achieved through the following technical solution: a method for manufacturing a non-magnetic spatial latticed shell structure composed of carbon fiber plate members. The load-bearing members of the latticed shell structure are made of non-magnetic carbon fiber plates, and the joints of a latticed shell structure are made of non-magnetic titanium alloy material. The magnetic shielding layer is provided on the roofing system above the structural layer, and a non-magnetic space with the magnetic field strength lower than 1 nT is formed inside the non-magnetic spatial latticed shell structure.

Further, the spatial latticed shell structure uses carbon fiber double-limb plate members as the main load-bearing member, and is manufactured by a following method: arranging two carbon fiber limb plates with a length of l, a thickness of t and a width of b in parallel at a distance h, and fixing the carbon fiber limb plates at an interval of d by way of inter-limb connection, thereby forming an hollow rectangular cross-section built-up member. An equivalent slenderness ratio formula used for internal force verification is as follows:

$$\text{weak axis slenderness ratio: } \lambda_{hy} = \alpha_g \alpha_t 2\sqrt{3} \sqrt{\frac{2l^2 t}{(2t+h)^3} + \frac{d^2}{t^2}}$$

$$\text{strong axis slenderness ratio: } \lambda_{hx} = \frac{2\sqrt{3}}{b}$$

where $\alpha_g$ represents a reduction factor related to a geometric size of the carbon fiber limb plate, and is to be determined based on an axial compression test of a double-limb spliced carbon fiber plate $\alpha_t$ represents a reduction factor related to an interlaminar shear strength of the carbon fiber limb plate, which needs to be determined according to the axial compression test of the double-limb spliced carbon fiber plate.

Further, the joint includes cross-shaped titanium alloy plates, a titanium alloy bolt group and carbon fiber limb plates, and is manufactured by a following method: fixing the carbon fiber limb plates and the cross-shaped titanium alloy plates using the titanium alloy bolt group in a frictional connection manner. The failure process of the titanium alloy joint when subjected to a moment load presents four stages of bonding-sliding-strengthening-failure. A joint rotation stiffness in the sliding and failure stages is relatively weak, and a joint rotation stiffness $K_1$ in the bonding stage and a joint rotation stiffness a joint rotation stiffness in the strengthening stage are designed and calculated as follows:

$$K_1 = \frac{Et_j b_j^3}{12l_j}$$

$$K_3 = \frac{1}{\frac{12l_j}{Et_j b_j^3} + \frac{\left(\frac{d_b}{t}\right)^2 \frac{(2t+t_j)^3}{192EI_b}\left[1+\frac{63.84EI_b}{GA_b(2t_m+t_j)^2}\right]}{\sum r_i^2} + \frac{E+E_c}{24\beta_b\beta_t d_b f_u \sum r_i^2}}$$

$$\beta_b = \min\left\{\frac{0.25e_b}{d}+0.5, \frac{0.25p_b}{d}+0.375\right\} \leq 1.25$$

$$\beta_t = \frac{1.5t_j}{16} \leq 2.5$$

where E represents the elastic modulus of titanium alloy; $t_j$ represents the thickness of the cross-shaped titanium alloy plate; $b_j$ represents the width of the cross-shaped titanium alloy plate; $l_j$ represents the effective length of the cross-shaped titanium alloy plates; $d_b$ represents the diameter of the titanium alloy bolts; t represents the thickness of the carbon fiber limb plates; $t_m$ represents the thickness of the carbon fiber limb plates; $I_b$ represents the moment of inertia of the titanium alloy bolts; $GA_b$ represents the section shear stiffness of the titanium alloy bolts; $\Sigma r_i^2$ represents the sum of squares of distances from respective bolts in the titanium alloy bolt group to the group center; $E_c$ represents the elastic modulus of carbon fiber; $\beta_b$ and $\beta_t$ represent coefficient values related to the bolt hole; $f_u$ represents the ultimate tensile strength of the cross-shaped titanium alloy plates; $e_b$ represents the minimum distance from the center of the bolt holes to the edge of the cross-shaped titanium alloy plates; and $p_b$ represents the bolt hole spacing.

Further, the magnetic shielding layer of the roofing system is made of permalloy, and is manufactured by a following method: sequentially installing a shielding layer pad, a shielding layer, a shielding laminate, a buffer layer, a permalloy plate and a batten on the carbon fiber double-limb plate member by fixing with titanium alloy bolts or screws.

Further, an economic and reasonable span of the spatial latticed shell structure reaches more than 30 m.

Further, the contact surface of the cross-shaped titanium alloy gusset plate and the carbon fiber limb plate is sandblasted to improve the friction between the carbon fiber limb plate and the cross-shaped titanium alloy gusset plate.

The present disclosure has the beneficial effects that:

1) The present disclosure innovatively uses the built-up double-limb carbon fiber plate members as the main members of the space latticed shell structure, fully utilizing the advantages of light weight, high strength and non-magnetic performance of the carbon fiber plates.

2) The carbon fiber plate members of the present disclosure can be prefabricated in factory with small manufacturing errors, and can be stored and transported conveniently. The joints are simple, the construction is convenient, and installation errors are minimal.

3) The titanium alloy joint and bolt connection structure of the present disclosure has the characteristics of low magnetism and high strength, and is well matched with carbon fiber plate members, providing reasonable load-bearing distribution for the structure.

4) The permalloy plate magnetic shielding roof structure of the present disclosure has the characteristics of simple structure, simple installation and reliable strength.

5) The non-magnetic latticed shell structure of the present disclosure can be applied not only to various functional buildings with high requirements for magnetic field shielding, but also to general construction engineering projects, as a new type of spatial structural form.

BRIEF DESCRIPTION OF DRAWINGS

In order to more clearly explain the embodiments of the present disclosure or the technical solution in the prior art, the drawings needed in the description of the embodiments or the prior art will be briefly introduced below. Obviously, the drawings in the following description are only some embodiments of the present disclosure, and other drawings can be obtained according to these drawings without creative labor for those skilled in the art.

DESCRIPTION OF EMBODIMENTS

Figure 1:
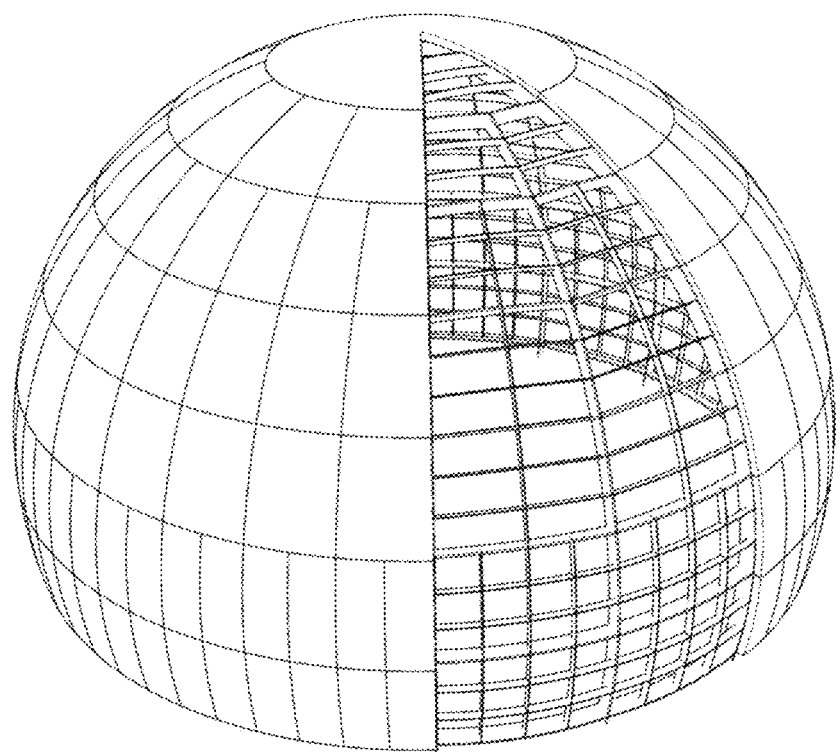
FIG. 1 is a schematic structural diagram of a space latticed shell for ribbed-type spherical latticed shells.

A preferred embodiments of the present disclosure will be described in detail below with reference to the drawings, so that the advantages and features of the present disclosure can be more easily understood by those skilled in the art, and the protection scope of the present disclosure can be more clearly defined. The concrete implementation process of manufacturing the non-magnetic spatial latticed shell structure is as follows:

(1) According to the requirements of the actual building, the geometric modeling of the structure is designed. In this implementation process, taking a spherical latticed shell structure as an example, a ribbed-type (as shown in FIG. 1) is divided. In the latticed shell structure, a carbon fiber double-limb plate member composed of two parallel carbon fiber limb plates by inter-limb connection are used as load-bearing members. Inter-limb connection is to fixedly connect the two parallel carbon fiber limb plates through several fixed limb plates with equal spacing, and connect them with titanium alloy joints and titanium alloy bolts. The titanium alloy joint consists of a cross-shaped titanium alloy gusset plate, a titanium alloy bolt group and a carbon fiber limb plate, and the carbon fiber limb plate and the cross-shaped titanium alloy gusset plate are fixed by a frictional connection mode through the titanium alloy bolt group. The contact surfaces of the cruciform titanium alloy gusset plates and the carbon fiber limb plates are all sandblasted to improve the friction between the carbon fiber limb plates and the cruciform titanium alloy gusset plates.

Figure 2:
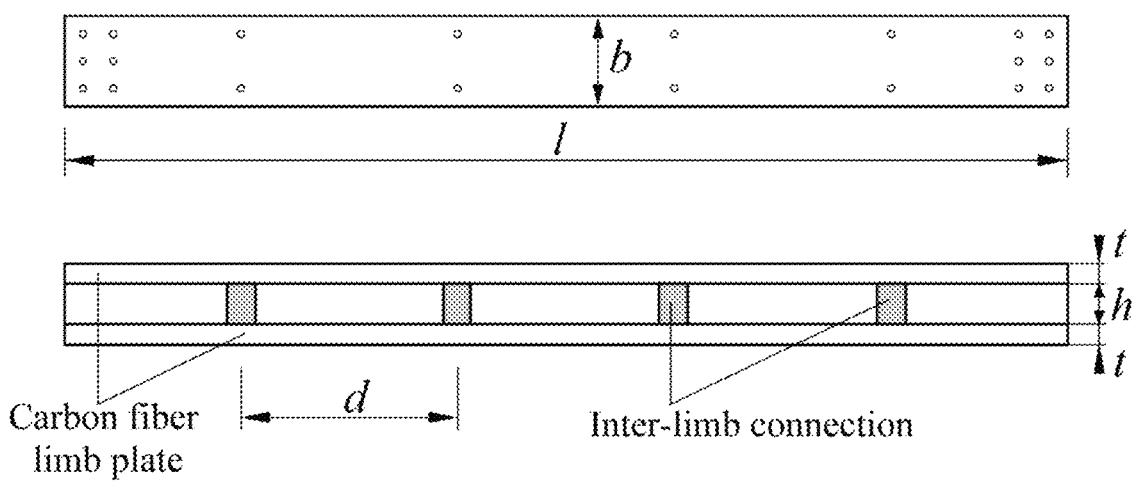
FIG. 2 is the composition and geometric dimension diagram of a carbon fiber plate member.
Figure 3:
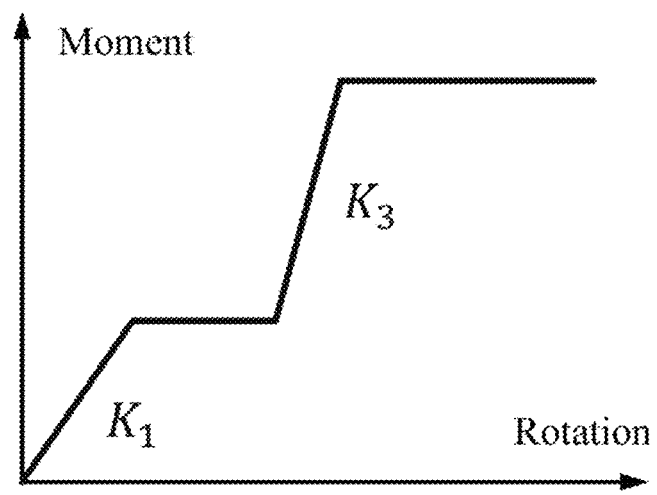
FIG. 3 is a schematic diagram of the load-displacement curve of a joint.

(2) A numerical model is established according to the lattice structure. Then, the initial cross-sectional dimensions of carbon fiber double-limb plate members and the initial dimensions of the double-limb connection structure (as shown in FIG. 2) are set. After that, the material properties of related members and joints are set. Finally, the moment-rotation curve of the joint rotational stiffness is preliminarily set according to the engineering requirements (as shown in FIG. 3).

(3) The static linear elasticity of the structure is calculated according to the known load conditions and support conditions, and the deflection and displacement of the structure are obtained. The building requirements are compared with relevant design specifications to check whether they meet the requirements. If they do not meet the requirements, the member size or joint rotation stiffness in step (2) is recalculated and the above steps are repeated.

(4) According to the known load conditions and support conditions, the elastoplastic static calculation of the structure considering double nonlinearity is carried out to obtain the ultimate bearing capacity of the structure, and the building requirements are compared with relevant design specifications to check whether they meet the requirements. If they do not meet the requirements, the component size or joint rotational stiffness in step (2) is recalculated and the above steps are repeated.

(5) The load information at the end of the member in the static calculation result is extracted, the strength and stability are checked according to the following equivalent slenderness ratio formula of the component, the building requirements are compared with relevant design specifications to check whether they meet the requirements. If they do not meet the requirements, the component size is recalculated in step (2), and the above steps are repeated:

$$\text{weak axis slenderness ratio: } \lambda_{hy} = \alpha_g \alpha_t 2\sqrt{3} \sqrt{\frac{2l^2 t}{(2t+h)^3} + \frac{d^2}{t^2}}$$

$$\text{strong axis slenderness ratio: } \lambda_{hx} = \frac{2\sqrt{3}\,l}{b}$$

where l is the length of the carbon fiber limb plate, t is the thickness of the carbon fiber limb plate, b is the width of the carbon fiber limb plate, h is the distance between two parallel carbon fiber limb plates, and d is the distance between fixed limb plates, $\alpha_g$ is a reduction factor related to a geometric size of the carbon fiber limb plate, which is to be determined according to an axial compression test of a double-limb spliced carbon fiber plate $\alpha_t$ is a reduction factor related to an interlaminar shear strength of the carbon fiber limb plate, which needs to be determined according to the axial compression test of the double-limb spliced carbon fiber plate.

Figure 4:
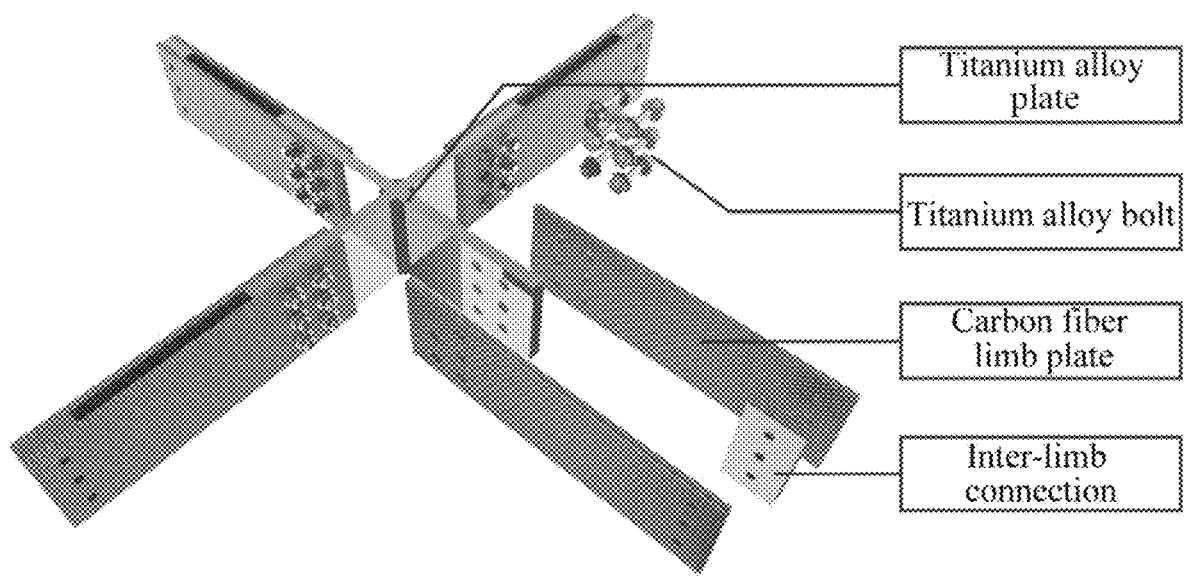
FIG. 4 is a schematic diagram of a joint.

(6) According to the moment-rotation angle curve of the joint rotational stiffness in step (2), the size and structure of the joint and bolt arrangement are obtained according to the following formula (as shown in FIG. 4). The failure process of the titanium alloy joint bearing a bending moment load presents four stages: bonding-sliding-strengthening-failure, in which the joint rotational stiffness in the sliding and failure stages is weak. The design of the joints is checked according to the actual structure and the structural requirements of relevant codes. If it does not meet the requirements, the moment-rotation curve of the joint stiffness in step (2) is recalculated and the above steps are repeated.

$$K_1 = \frac{Et_j b_j^3}{12 l_j}$$

$$K_3 = \frac{1}{\frac{12 l_j}{Et_j b_j^3} + \frac{\left(\frac{d_b}{t}\right)^2 \frac{(2t+t_j)^3}{192 EI_b}\left[1 + \frac{63.84 EI_b}{GA_b(2t_m + t_j)^2}\right]}{\sum r_i^2} + \frac{E + E_c}{24 \beta_b \beta_t d_b f_u \sum r_i^2}}$$

$$\beta_b = \min\left\{\frac{0.25 e_b}{d} + 0.5, \frac{0.25 p_b}{d} + 0.375\right\} \le 1.25$$

$$\beta_t = \frac{1.5 t_j}{16} \le 2.5$$

where E represents the elastic modulus of titanium alloy; $t_j$ represents the thickness of the cross-shaped titanium alloy plate; $b_j$ represents the width of the cross-shaped titanium alloy plate; $l_j$ represents the effective length of the cross-shaped titanium alloy plates; $d_b$ represents the diameter of the titanium alloy bolts; t represents the thickness of the carbon fiber limb plates; $t_m$ represents the thickness of the carbon fiber limb plates; $I_b$ represents the moment of inertia of the titanium alloy bolts; $GA_b$ represents the section shear stiffness of the titanium alloy bolts; $\Sigma r_i^2$ represents the sum of squares of distances from respective bolts in the titanium alloy bolt group to the group center; $E_c$ represents the elastic modulus of carbon fiber; $\beta_b$ and $\beta_t$ represent coefficient values related to the bolt hole; $f_u$ represents the ultimate tensile strength of the cross-shaped titanium alloy plates; $e_b$ represents the minimum distance from the center of the bolt holes to the edge of the cross-shaped titanium alloy plates; and $p_b$ represents the bolt hole spacing.

Figure 5:
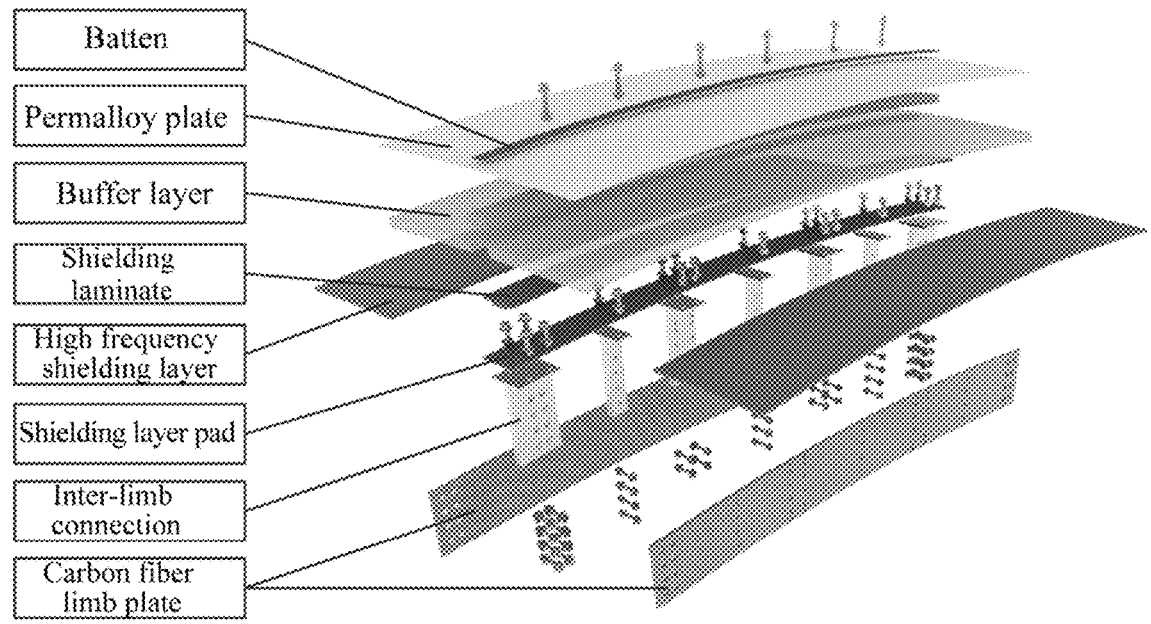
FIG. 5 is a schematic structural diagram of the magnetic shielding layer of the roofing system.

(7) On the basis of the above design parameters, a magnetically shielded roofing system is disposed. A shielding layer pad, a shielding layer, a shielding laminate, a buffer layer, a permalloy plate, a batten and other components are sequentially installed on the carbon fiber plate member to form a roofing system (as shown in FIG. 5). Permalloy plates with magnetic shielding properties are densely distributed in the roofing system above the structural layer, a space with magnetic field strength less than 1 nT is formed inside the latticed shell, and the space inside the latticed shell has the characteristics of near zero remanence.

Figure 6:
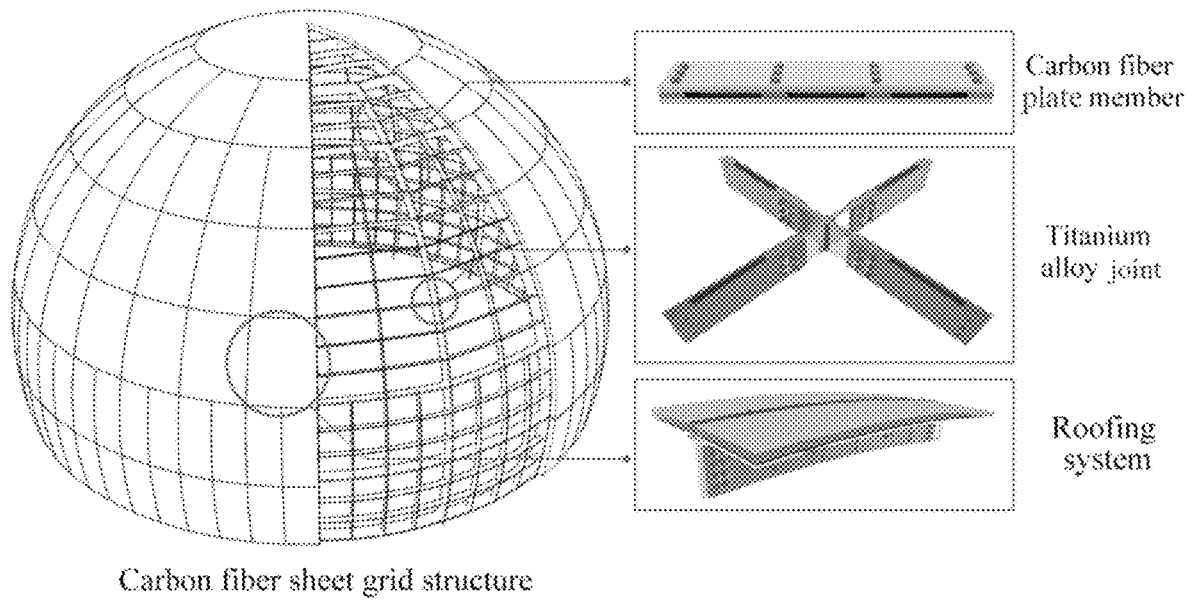
FIG. 6 is a schematic diagram of the integral latticed shell structure and its basic components.

(8) Finally, an embodiment of the method for manufacturing a non-magnetic spatial latticed shell structure is obtained (as shown in FIG. 6).

The above embodiment is only a preferred embodiment of the present disclosure, which does not limit the patent scope of the present disclosure. Any equivalent structure or equivalent process transformation made by using the contents of the specification and drawings of the present disclosure, or directly or indirectly applied to other related technical fields, are equally included in the scope of the present disclosure.

What is claimed is:

1. A method for manufacturing a non-magnetic spatial latticed shell structure composed of carbon fiber plate members, wherein load-bearing members of the non-magnetic spatial latticed shell structure are made of non-magnetic carbon fiber plates, and a joint of the non-magnetic spatial latticed shell structure is made of a non-magnetic titanium alloy material, a magnetic shielding layer is provided on a roofing system above a structural layer, and a non-magnetic space with a magnetic field strength lower than 1 nT is formed inside the non-magnetic spatial latticed shell structure.

2. The method for manufacturing the non-magnetic spatial latticed shell structure composed of the carbon fiber plate members according to claim 1, wherein the non-magnetic spatial latticed shell structure uses carbon fiber double-limb plate members as the main load-bearing members, and the carbon fiber double-limb plate members are manufactured by a following method: arranging two carbon fiber limb plates with a length of l, a thickness of t and a width of b in parallel at a distance h, and fixing the carbon fiber limb plates at an interval of d by inter-limb connections, thereby forming a hollow rectangular cross-section built-up member, wherein equivalent slenderness ratios for internal force verification are calculated as follows:

$$\text{weak axis slenderness ratio: } \lambda_{hy} = \alpha_g \alpha_t 2\sqrt{3} \sqrt{\frac{2l^2 t}{(2t+h)^3} + \frac{d^2}{l^2}}$$

$$\text{strong axis slenderness ratio: } \lambda_{hx} = \frac{2\sqrt{3}\, l}{b}$$

where $\alpha_g$ represents a reduction factor related to a geometric size of the carbon fiber limb plate, and is to be determined based on an axial compression test of a double-limb spliced carbon fiber plate; and $\alpha_t$ represents a reduction factor related to an interlaminar shear strength of the carbon fiber limb plate, and needs to be determined based on the axial compression test of the double-limb spliced carbon fiber plate.

3. The method for manufacturing the non-magnetic spatial latticed shell structure composed of the carbon fiber plate members according to claim 1, wherein the joint comprises a cross-shaped titanium alloy plate, a titanium alloy bolt group and a carbon fiber limb plate, and is manufactured by a following method: fixing the carbon fiber limb plate and the cross-shaped titanium alloy plate using the titanium alloy bolt group in a frictional connection manner to form a titanium alloy joint, wherein a failure process of the titanium alloy joint when subjected to a moment load presents four stages of bonding-sliding-strengthening-failure, and wherein a joint rotation stiffness in the sliding and failure stages is relatively weak, and a joint rotation stiffness $K_1$ in the bonding stage and a joint rotation stiffness a joint rotation stiffness in the strengthening stage are designed and calculated as follows:

$$K_1 = \frac{E t_j b_j^3}{12 l_j}$$

$$K_3 = \frac{1}{\frac{12 l_j}{E t_j b_j^3} + \frac{\left(\frac{d_b}{t}\right)^2 \frac{(2t+t_j)^3}{192 E I_b}\left[1 + \frac{63.84 E I_b}{G A_b (2t_m + t_j)^2}\right]}{\sum r_i^2} + \frac{E + E_c}{24 \beta_b \beta_t d_b f_u \sum r_i^2}}$$

$$\beta_b = \min\left\{\frac{0.25 e_b}{d} + 0.5,\ \frac{0.25 p_b}{d} + 0.375\right\} \le 1.25$$

$$\beta_t = \frac{1.5 t_j}{16} \le 2.5$$

where E represents an elastic modulus of titanium alloy; $t_j$ represents a thickness of the cross-shaped titanium alloy plate; $b_j$ represents a width of the cross-shaped titanium alloy plate; $l_j$ represents an effective length of the cross-shaped titanium alloy plates; $d_b$ represents a diameter of titanium alloy bolts; t represents a thickness of the carbon fiber limb plates; $t_m$ represents a thickness of the carbon fiber limb plates; $I_b$ represents a moment of inertia of the titanium alloy bolts; $GA_b$ represents a section shear stiffness of the titanium alloy bolts; $\Sigma r_i^2$ represents a sum of squares of distances from respective bolts in the titanium alloy bolt group to a group center; $E_c$ represents an elastic modulus of carbon fiber; $\beta_b$ and $\beta_t$ represent coefficient values related to a bolt hole; $f_u$ represents a ultimate tensile strength of the cross-shaped titanium alloy plates; $e_b$ represents a minimum distance from a center of bolt holes to an edge of the cross-shaped titanium alloy plates; and $p_b$ represents a bolt hole spacing.

4. The method for manufacturing the non-magnetic spatial latticed shell structure composed of the carbon fiber plate members according to claim 2, wherein the magnetic shielding layer of the roofing system is made of permalloy, and is manufactured by a following method: sequentially installing a shielding layer pad, a shielding layer, a shielding laminate, a buffer layer, a permalloy plate and a batten on the carbon fiber double-limb plate member by fixing with titanium alloy bolts or screws.

5. The method for manufacturing the non-magnetic spatial latticed shell structure composed of the carbon fiber plate members according to claim 1, wherein a span of the spatial latticed shell structure is greater than or equal to 30 m.

6. The method for manufacturing the non-magnetic spatial latticed shell structure composed of the carbon fiber plate members according to claim 3, wherein a contact surface of the cross-shaped titanium alloy plate and a contact surface of the carbon fiber limb plate are both sandblasted to improve a friction between the carbon fiber limb plate and the cross-shaped titanium alloy plate.

\* \* \* \* \*